(12) United States Patent
Rupp et al.

(10) Patent No.: US 12,459,446 B2
(45) Date of Patent: Nov. 4, 2025

(54) SENSOR MOUNTING ASSEMBLY IN VEHICLES

(71) Applicant: Honda Motor Co., Ltd., Tokyo (JP)

(72) Inventors: Timothy J. Rupp, Dublin, OH (US); Connor Isings, Columbus, OH (US); David J Rose, West Mansfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 18/497,751

(22) Filed: Oct. 30, 2023

(65) Prior Publication Data

US 2025/0136021 A1    May 1, 2025

(51) Int. Cl.
  B60R 11/04    (2006.01)
  B60R 11/00    (2006.01)

(52) U.S. Cl.
  CPC ......... B60R 11/04 (2013.01); *B60R 2011/004* (2013.01)

(58) Field of Classification Search
  CPC .. H04N 5/2252; H04N 5/2251; G08B 15/001; G08B 13/19632; G08B 13/1963; G08B 13/19619; G08B 13/19617; G03B 17/02; G03B 17/08; B60R 11/04; B60R 2011/004
  USPC ................................................. 348/373–375
  See application file for complete search history.

(56) References Cited

U.S. PATENT DOCUMENTS

| 10,272,850 | B2* | 4/2019 | Frank ..................... B62D 25/06 |
| 10,302,744 | B1* | 5/2019 | Krishnan ................ B60R 11/04 |
| 10,471,905 | B2 | 11/2019 | Ikeno |
| 10,764,988 | B2 | 9/2020 | Wada |
| 10,850,710 | B2 | 12/2020 | Frederick et al. |
| 11,209,821 | B2* | 12/2021 | Valois ..................... H04L 67/12 |
| 2019/0315409 | A1* | 10/2019 | Ghannam ............... B60R 11/00 |
| 2021/0252562 | A1 | 8/2021 | Tatara et al. |
| 2023/0303008 | A1* | 9/2023 | Shane ................. B60R 16/0222 |
| 2023/0406282 | A1* | 12/2023 | Kumar ................ B60W 60/001 |

FOREIGN PATENT DOCUMENTS

| CN | 106143336 B | 6/2018 |
| CN | 210268714 U | 4/2020 |
| CN | 211043675 U | 7/2020 |
| CN | 216900910 U | 7/2022 |
| CN | 115267735 A | 11/2022 |
| DE | 102019122186 B4 | 3/2021 |
| DE | 102021125326 A1 | 3/2022 |
| JP | 4232516 B2 | 3/2009 |
| KR | 20220145537 A | 10/2022 |
| WO | 2021060435 A1 | 4/2021 |

* cited by examiner

*Primary Examiner* — Lin Ye
*Assistant Examiner* — Chan T Nguyen
(74) *Attorney, Agent, or Firm* — Mark Duell; American Honda Motor Co., Inc.

(57) ABSTRACT

A sensor mounting assembly is provided. The sensor mounting assembly includes a cover coupled to a glass roof of a vehicle. The cover encloses a sensor disposed proximate to the glass roof of the vehicle. The sensor mounting assembly further includes a bracket coupled to a roof rail located beneath the glass roof of the vehicle. The bracket has a first portion and a second portion. The first portion holds the sensor and the second portion forms a funnel shaped alignment member to align the cover with the bracket.

20 Claims, 5 Drawing Sheets

500

Couple cover to glass roof of vehicle such that cover encloses sensor disposed proximate to glass roof of vehicle 502

Couple bracket to roof rail located beneath glass roof of vehicle, where bracket has first portion holding sensor and second portion forming funnel shaped alignment member aligning cover with bracket 504

FIG. 5

SENSOR MOUNTING ASSEMBLY IN VEHICLES

BACKGROUND

Vehicles generally have multiple sensors, which may be configured to sense various information based on which several operations of the vehicle are controlled. For example, the vehicle may include vision sensors, such as, one of: a charge coupled device (CCD) sensor, a complementary metal oxide semiconductor (CMOS) sensor, a RADAR sensor, a LiDAR sensor, an infrared sensor, and the like, which may be used to measure surrounding data/images to further control movements of the vehicle. In certain instances, the vision sensors may be located on a roof of the vehicle, to facilitate an optimal field-of-view for the vision sensors. In such instances, it may be difficult for an operator to perform precise positioning and assembly of the vision sensors on the roof of the vehicle, which may eventually impact ergonomics in an assembly line of the vehicle.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a sensor mounting assembly is provided. The sensor mounting assembly may include a cover coupled to a glass roof of a vehicle. The cover may be configured to enclose a sensor that is disposed proximate to the glass roof of the vehicle. The sensor mounting assembly may further include a bracket coupled to a roof rail that may be located beneath the glass roof of the vehicle. The bracket may have a first portion and a second portion. The first portion may be configured to hold the sensor and the second portion may form a funnel shaped alignment member that may be configured to align the cover with the bracket.

According to an embodiment of the disclosure, a sensor mounting assembly is disclosed. The sensor mounting assembly may include a cover. The cover may be configured to enclose a sensor that may be disposed proximate to a glass roof of a vehicle. The bracket may be coupled to a roof rail that may be located beneath the glass roof of the vehicle. The bracket may have a first portion and a second portion. The first portion may be configured to hold the sensor, and the second portion may form a funnel shaped alignment member that has a first orifice and a second orifice. The first orifice may align the cover with the bracket, and the second orifice may lock datum levels of the cover and the bracket based on a user preference. The first orifice may be larger than the second orifice.

According to another embodiment of the disclosure, a method for forming a sensor assembly is provided. The method may include coupling a cover to a glass roof of a vehicle. The cover may be configured to enclose a sensor that is disposed proximate to the glass roof of the vehicle. The method may further include coupling a bracket to a roof rail that may be located beneath the glass roof of the vehicle. The bracket may have a first portion and a second portion. The first portion may be configured to hold the sensor, and the second portion may form a funnel shaped alignment member that may be configured to align the cover with the bracket.

BRIEF DESCRIPTION OF THE DRAWINGS

FIG. 5 is a flowchart that illustrates exemplary operations for forming a sensor mounting assembly, in accordance with an embodiment of the disclosure.

Figure 1:
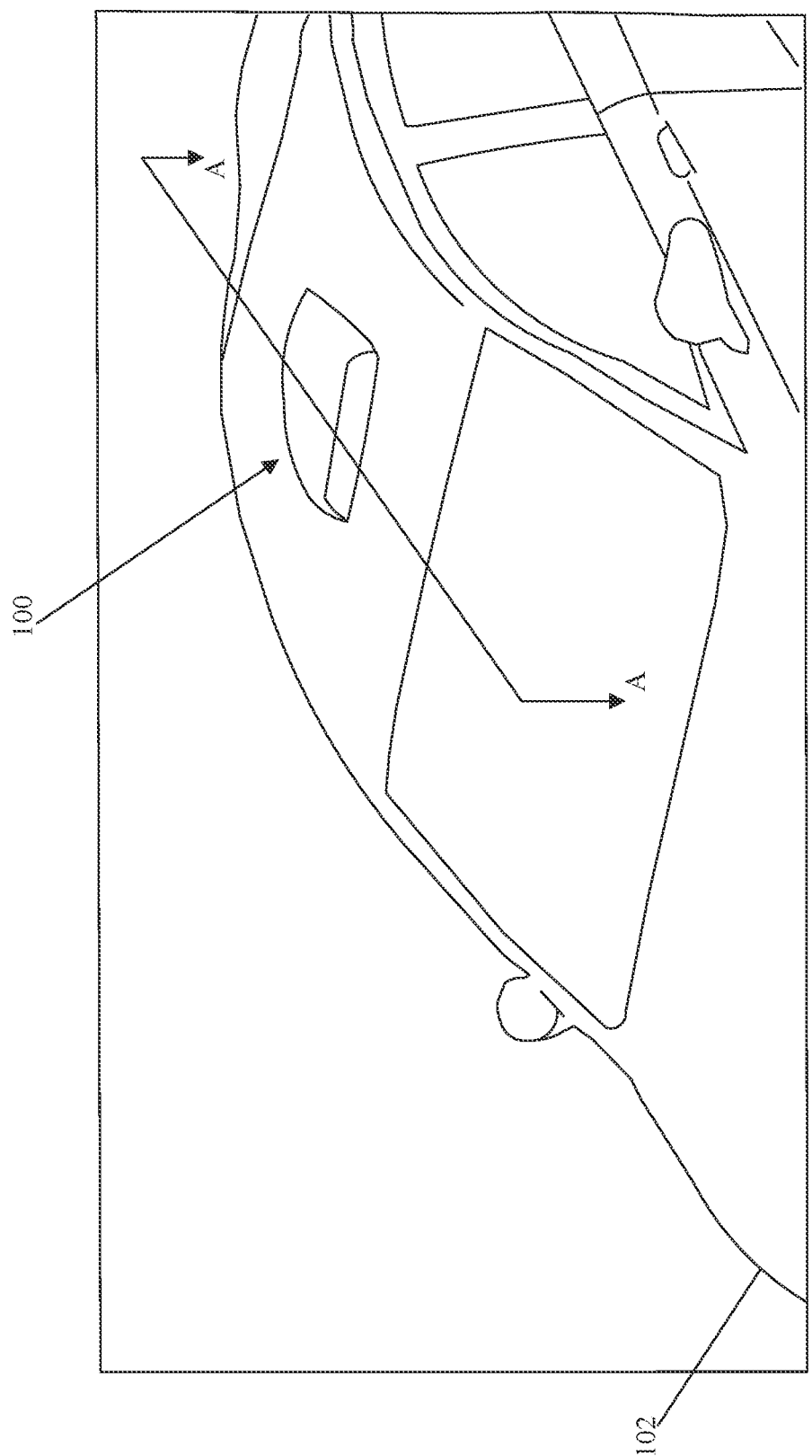
FIG. 1 is a diagram that illustrates an isometric view of a sensor mounting assembly for a vehicle, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed sensor mounting assembly. The sensor mounting assembly may include a cover that may be coupled to a glass roof of a vehicle and configured to enclose a sensor that is disposed proximate to the glass roof of the vehicle. In an event of assembly, the sensor is initially disposed proximate to the glass roof and then enclosed by the cover. Hence, it may be easier for an operator to perform precise positioning and assembly of the sensor on the roof of the vehicle, which may eventually improve ergonomics in an assembly line of the vehicle.

The sensor mounting assembly may further include a bracket that may be coupled to a roof rail that may be located beneath the glass roof of the vehicle. The bracket may have a first portion and a second portion. The first portion may be configured to hold the sensor and the second portion may form a funnel shaped alignment member that may be configured to align the cover with the bracket. Hence, it may be further easier for the operator to perform precise positioning and assembly of the sensor on the roof of the vehicle, which may further improve ergonomics in the assembly line of the vehicle.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a diagram that illustrates an isometric view of a sensor mounting assembly for a vehicle, in accordance with an embodiment of the disclosure. With reference to FIG. 1, there is shown a sensor mounting assembly 100 for a vehicle 102.

Figure 2:
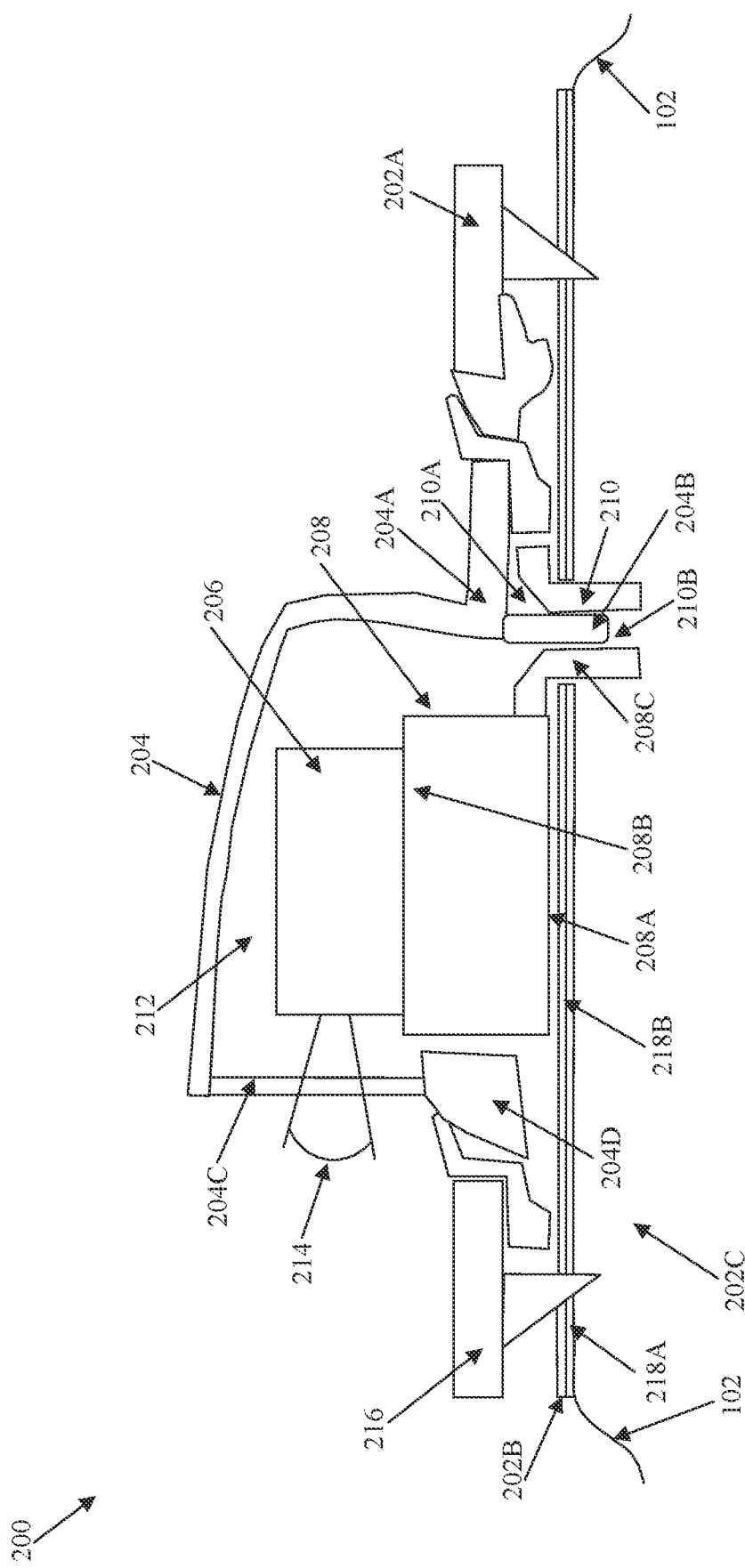
FIG. 2 is a diagram that illustrates a cross-sectional view of the sensor mounting assembly of FIG. 1, in accordance with an embodiment of the disclosure.

The sensor mounting assembly 100 has a suitable design, shape, and structure, which may be configured to secure a sensor (as shown in FIG. 2) of the vehicle 102. For example, the sensor mounting assembly 100 may generally include multiple components (as shown in FIG. 2), for example, a cover and a bracket. The cover may be configured to enclose the sensor of the vehicle 102 and the bracket may be configured to hold and secure the sensor of the vehicle 102. Details of such cover and the bracket may be further described, for example, in FIG. 2. In an embodiment, the sensor mounting assembly 100 may be located on a top surface of the vehicle 102. In another embodiment, the sensor mounting assembly 100 may be located on a frontal portion of the top surface of the vehicle 102. The sensor mounting assembly 100 may generally have a substantially arcuate profile, to improve aerodynamics of the vehicle 102. However, it may be noted that the substantially arcuate profile is merely an example and the sensor mounting assembly 100 may include any structural profile, for example, a rectangular profile, a square profile, a polygonal profile, and the like. Based on user requirements and structural aspects of the vehicle 102, such structural profile of the sensor mounting assembly 100 may be modified.

Figure 3:
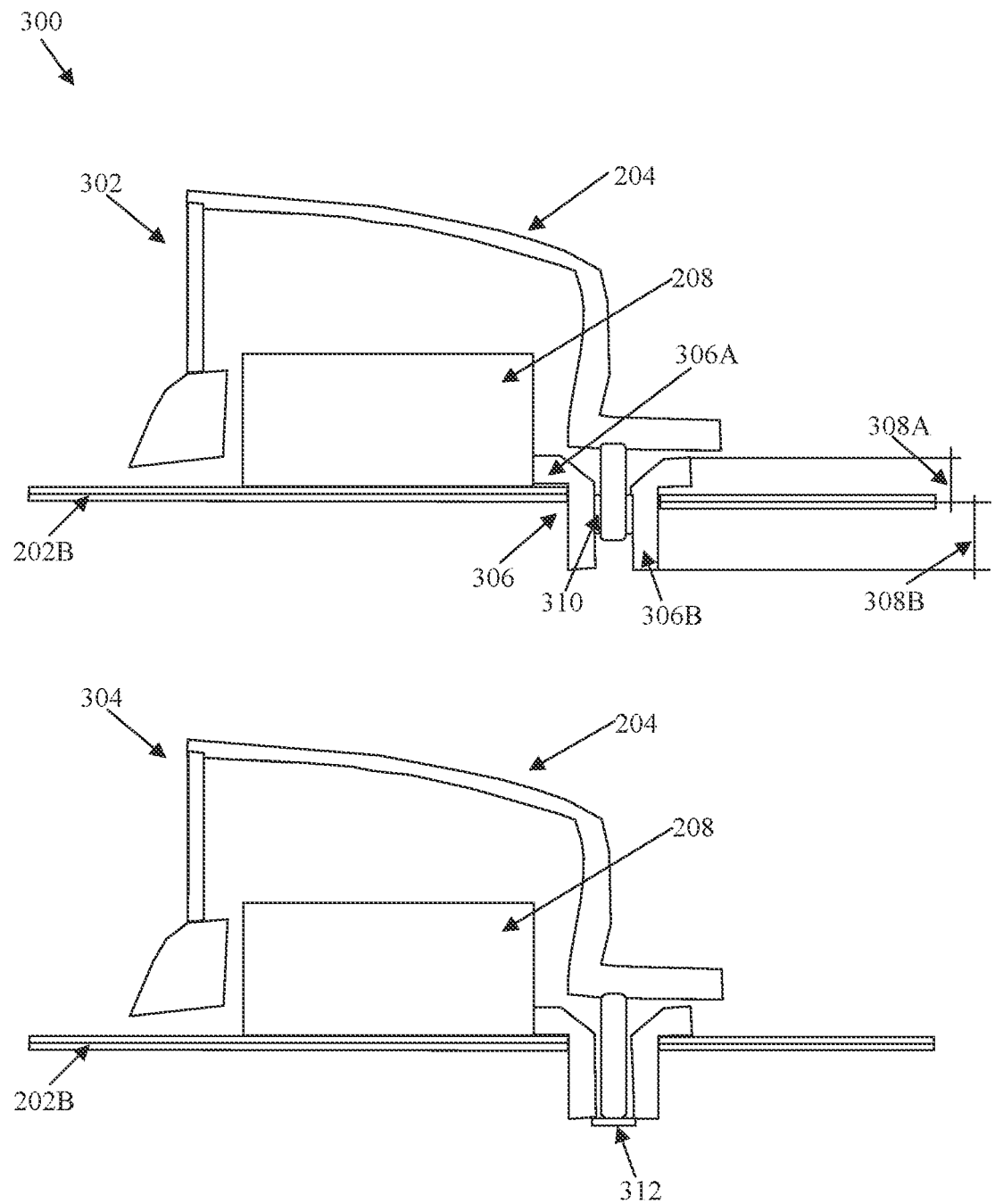
FIG. 3 is a diagram that illustrates an exemplary scenario to couple a cover with a bracket of the sensor mounting assembly of FIG. 1, in accordance with an embodiment of the disclosure.

The vehicle 102 may be a non-autonomous vehicle, a semi-autonomous vehicle, or a fully autonomous vehicle, for example, as defined by National Highway Traffic Safety Administration (NHTSA) or Society of Automotive Engineers (SAE) automation levels. Examples of the vehicle 102 may include, but are not limited to, a single-wheeler vehicle, a two-wheeler vehicle, a three-wheeler vehicle, a four-wheeler vehicle, or a multi-wheeled vehicle. It may be noted here that the vehicle 102 shown as the four-wheeler vehicle in FIG. 1, is merely shown as example. The present disclosure may be also applicable to other types of vehicles, such as, two-wheeler vehicles (for example, a scooter) or three-wheeler vehicles, and the like. The description of other types of the vehicle 102 has been omitted from the disclosure for the sake of brevity. In certain cases, the vehicle 102 may also be a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other individual forms of alternative energy sources, or a combination of alternative energy sources. The sensor mounting assembly 100 and the vehicle 102 of FIG. 1 is illustratively cut along a first section A-A (as shown in FIG. 2) and a second section B-B (as shown in FIG. 3), to describe other components of the sensor mounting assembly 100 and the vehicle 102.

FIG. 2 is a diagram that illustrates a cross-sectional view of the sensor mounting assembly of FIG. 1, in accordance with an embodiment of the disclosure. FIG. 2 is described in conjunction with elements from FIG. 1. With reference to FIG. 2, there is shown a cross-sectional view 200 of the sensor mounting assembly 100 and the vehicle 102, which may be sectioned along the first section A-A of FIG. 1.

The vehicle 102 may include a glass roof 202A that may be disposed on a roof (for example, a top surface) of the vehicle 102, a roof rail 202B beneath the glass roof 202A, and an interior cabin 202C to accommodate an occupant or an operator of the vehicle 102. The glass roof 202A may be a panel that may be fixed to the roof of the vehicle 102. In an embodiment, the glass roof 202A may be a fixed panel that may be fixedly coupled to the roof of the vehicle 102. In another embodiment, the glass roof 202A may be a movable panel that may be moveably coupled to the roof of the vehicle 102. In yet another embodiment, the glass roof 202A may be a fixed panel that further includes a moveable section, such that, the moveable section of the glass roof 202A may be configured to be moveably coupled to the roof of the vehicle 102. The glass roof 202A may be manufactured as a transparent panel or a tinted panel, based on the user preference. In an embodiment, the glass roof 202A is generally supported on the roof rail 202B.

The roof rail 202B may include a plurality of rails which may be secured to the roof of the vehicle 102. In an embodiment, the roof rail 202B may be located beneath the glass roof 202A and configured to secure components of the sensor mounting assembly 100. In another embodiment, the roof rail 202B may also be configured to secure other objects (for example, a cargo) on the roof of the vehicle, so that, there may be an increased space in the interior cabin 202C of the vehicle 102.

The interior cabin 202C of the vehicle 102 may be a space in the vehicle, which may be configured to accommodate the occupant or the operator of the vehicle. In certain instances, the operator or the occupant may directly assemble the components of the sensor mounting assembly 100 from the interior cabin 202C of the vehicle than climbing on to the vehicle 102 to assemble the sensor mounting assembly 100. Hence, it may be easier for the operator or the occupant to assemble components of the sensor mounting assembly 100 from the interior cabin 202C than from the roof of the vehicle 102. For example, in case of a service event of a sensor 206 in the sensor mounting assembly 100, it may be easier for the operator or the occupant to repair components of the sensor mounting assembly 100 from the interior cabin 202C than climbing on to the roof of the vehicle 102. Details of the service event is further explained, for example, in FIG. 3.

Further referring to the FIG. 2, the sensor mounting assembly 100 may include a cover 204, a sensor 206 enclosed by the cover 204, and a bracket 208 to secure the sensor 206. The bracket 208 may also be configured to couple with the cover 204 and form a storage cavity 212 for the sensor 206, such that, the cover 204 may be configured to enclose the sensor 206, via the storage cavity 212.

The cover 204 may include a suitable design, shape, and structure, which may be configured to enclose the sensor 206. In an example, the cover 204 may form a substantially arcuate enclosure to enclose the sensor 206 on the roof of the vehicle 102. Such substantially arcuate enclosure may allow the sensor 206 to be protected from dust or debris; and further allow the sensor 206 to detect a surrounding environment without affecting aerodynamics of the vehicle 102. The cover 204 may be generally disposed on the roof of the vehicle 102. In an embodiment, the cover 204 may be secured by the glass roof 202A of the vehicle 102. In another embodiment, the cover 204 may be secured by the roof rail 202B of the vehicle 102. In yet another embodiment, the cover 204 may be secured by a combination of the glass roof 202A and the roof rail 202B of the vehicle 102. The cover 204 may include a section 204A, a protrusion 204B, a viewing window 204C, and an end segment 204D.

The section 204A may include a suitable design, shape, and structure, which may be configured to form an integral substructure (for example, a foundation) for the cover 204. For example, the section 204A may be a fixed coupling member (such as a fixed flange), which may be configured to be coupled with the glass roof 202A and form the integral substructure for the cover 204. In another example, the section 204A may be a removable coupling member (such as a removable flange), which may be configured to be coupled with the glass roof 202A.

In an embodiment, the section 204A may be formed on a rear end of the sensor mounting assembly 100. In another embodiment, the section 204A may be formed on a front end of the sensor mounting assembly 100. In yet another embodiment, the section 204A may be formed on both the front end and the rear end of the sensor mounting assembly 100. The section 204A may have a substantially horizontal structure, as shown in FIG. 2. However, the section 204A may have any other structure, such as, but not limited to, a C-shaped structure, V-shaped structure, a H-shaped structure, a U-shaped structure, and the like. In an embodiment, the section 204A may be integrally connected with the protrusion 204B.

The protrusion 204B may include a suitable design, shape, and structure, which may be configured to extend from the section 204A of the cover 204. In an example, the protrusion 204B may extend substantially perpendicular from an edge of the section 204A, such that, the protrusion 204B engages with a portion of the bracket 208. In certain instances, the protrusion 204B may be suitably gripped on to the bracket 208 to align datum levels between the cover 204 and the bracket 208. Such datum levels may be modified based on a linear movement of the protrusion 204B into the portion of the bracket 208. In an embodiment, the protrusion 204B may have a substantially circular profile, which may allow a smooth movement of the protrusion 204B inside a substantially circular profile of the portion of the bracket 208. Based on the alignment of the protrusion 204B of the cover 204 on the bracket 208, the operator may align the viewing window 204C for the sensor 206 of the sensor mounting assembly 100.

The viewing window 204C may be configured to provide a panoramic view 214 (for example, a 360-degree field-of-view) for the sensor 206 in the sensor mounting assembly 100. In an example, the viewing window 204C may be disposed at the proximal end of the cover 204 and facilitates the panoramic view 214 for the sensor 206. In an embodiment, the viewing window 204C may be formed from a transparent material (such as, a glass material, a quartz material, a sapphire material, and the like). In another embodiment, the viewing window 204C may be tinted based on the user preference. For example, the viewing window 204C may be tinted at a specific color, which may be analogous to a color of a painted coating on a surface of the vehicle 102. Such specialized tinting of the viewing window 204C may improve aesthetics of the vehicle 102.

In an embodiment, the viewing window 204C may be include the end segment 204D, which may be configured to be secured to a portion of the vehicle 102. For example, the end segment 204D may form a seal against the portion of the vehicle 102 and protect the sensor 206 against the ingress of fluids (such as, via the rainfall or other liquids) and the ingress of dust particles from the surrounding environment of the vehicle 102. In another example, the viewing window 204C may be coupled to a portion of the cover 204 and may form a secondary seal to protect the sensor 206 against the ingress of fluids (such as, via the rainfall or other liquids) and the ingress of dust particles from the surrounding environment of the vehicle 102.

In an embodiment, the end segment 204D of the cover 204 may be shown as a block in FIG. 1B. However, the end segment 204D of the cover 204 may have any structural profile, such as, a rod, a sphere, or any other polygonal shape, based on user requirements and a level of sealing that may be required for the sensor 206 in the sensor mounting assembly 100.

The sensor 206 may include a suitable circuitry, logic, and network interfaces, which may be secured to a portion of the bracket 208 and configured to capture an image or a plurality of images of one or more objects in the surrounding environment of the vehicle 102. In an embodiment, the sensor 206 may include a 360-degree camera, which may be configured to capture a 360-degree view of the surrounding environment of the vehicle 102. In an embodiment, the 360-degree camera may be a single 360-degree camera (for example, a LIDAR sensor), which may be configured to capture the 360-degree view of the surrounding environment of the vehicle 102.

In another embodiment, the sensor 206 may include a plurality of image sensors (not shown) to capture the 360-degree view of the surrounding environment of the vehicle 102. Each image sensor of the plurality image sensors may be configured to capture a portion of the 360-degree view of the surrounding environment of the vehicle 102. In an embodiment, the sensor 206 (i.e., the 360-degree camera) may be configured to stitch each captured portion of the plurality image sensors to generate the 360-degree view of the surrounding environment of the vehicle 102.

The sensor 206 (such as, the 360-degree camera) may be disposed on the bracket 208 and installed within the sensor mounting assembly 100. Examples of the 360-degree camera may include, but are not limited to, the LiDAR sensor, an omnidirectional camera, a panoramic camera, a charge coupled device (CCD) sensor, a complementary metal oxide semiconductor (CMOS) sensor, a RADAR sensor, an infrared sensor, an image sensor, a wide-angle camera, an action camera, a camcorder, a camera with an integrated depth sensor, a cinematic camera, Digital Single-Lens Reflex (DSLR) camera, a Digital Single-Lens Mirrorless (DSLM) camera, a digital camera, camera phones, a time-of-flight camera (ToF camera), a night-vision camera, and/or other image capturing or devices with 360-degree view capturing capability.

In a preferred embodiment, the sensor 206 may be the LiDAR sensor that has a horizontal field-of-view (for example, the panoramic view 214 of the sensor 206 along a horizontal plane) between 1-360 degrees and further has a vertical field-of-view (for example, the panoramic view 214 of the sensor 206 along a vertical plane) between 1-45 degrees. In an embodiment, the cover 204 may have the viewing window 204C that may be configured to allow at least one of: the horizontal field-of-view and the vertical field-of-view for the sensor 206. In another embodiment, the viewing window 204C may be configured to allow a combination of the horizontal field-of-view and the vertical field-of-view for the sensor 206.

The LiDAR sensor may perform a 360-degrees scan of the surrounding environment to identify a target object. For example, the target object may be identified-based on an emission of a laser illumination on the target object and a time taken to receive a reflected laser illumination from the target object. As the sensor 206 is sealed on the proximal end (such as, via the end segment 204D) of the cover 204 and the distal end (such as, via the section 204A) of the cover 204 from the surrounding environment (such as, the rainfall, dust, and the like), there may be a substantial reduction in service events of the sensor 206, which may substantially save service costs of the sensor 206 that may be disposed on the bracket 208.

The bracket 208 may include a suitable design, shape, and structure, which may be configured to be coupled to the roof rail 202B that may be located beneath the glass roof 202A of the vehicle 102. In an embodiment, the bracket 208 may be configured to be secured to the roof rail 202B from the interior cabin 202C of the vehicle 102 and hold the sensor 206 proximate to the glass roof 202A of the vehicle 102. In an example, the bracket 208 may have a substantially L-shaped profile. The substantially L-shaped profile of the bracket 208 may have a base 208A, a first portion 208B, and a second portion 208C.

The base 208A of the bracket is disposed on a roof rail 202B. In an embodiment, the first portion 208B of the bracket 208 may extend towards a first direction of the base 208A and the second portion 208C of the bracket 208 may extend towards a second direction of the base 208A. In an alternate example, the first direction of the of the base 208A is substantially opposite to the second direction of the base 208A. In another example, the first direction of the base 208A is substantially same as the second direction of the base 208A. The base 208A may be configured to be secured to the roof rail 202B from the interior cabin 202C of the vehicle 102.

The first portion 208B may include a suitable design, shape, and structure, which may be configured to hold the sensor 206. For example, the first portion 208B may have a substantially flat surface, which may be configured to hold the sensor 206. In another example, the first portion 208B may also have other surface textures, such as, a corrugated surface, to improve fixation of the sensor 206 against the first portion 208B of the bracket 208. In an embodiment, the first portion 208B may be disposed at a first height (not shown) from the roof rail 202B in the first direction. In an embodiment, the first portion 208B may be integrally connected with the second portion 208C to form the bracket 208. For example, the first portion 208B and the second portion 208C may be formed from a same material and manufactured as a unitary element. In another embodiment, the first portion 208B may be releasably connected with the second portion 208C to form the bracket 208. For example, the first portion 208B may be formed from a material that may be different from a material of the second portion 208C.

The second portion 208C may include a suitable design, shape, and structure, which may form a funnel shaped alignment member 210 to receive the protrusion 204B of the cover 204. In an example, the second portion 208C may have a substantially flat surface, which may be configured to secure the protrusion 204B. In another example, the second portion 208C may also have other surface textures, such as, a corrugated surface, to improve fixation of the protrusion 204B against the second portion 208C of the bracket 208. In an embodiment, the second portion 208C may be disposed at a second height (not shown) from the roof rail 202B in the second direction. In an embodiment, the second height may be lesser than the first height. In another embodiment, the second height may be higher than the first height. In yet another embodiment, the second height is same as the first height.

The second portion 208C may be integrally connected with the first portion 208B to form the bracket 208. For example, the first portion 208B and the second portion 208C may be formed from a same material and manufactured as a unitary element. In another embodiment, the second portion 208C may be releasably connected with the first portion 208B to form the bracket 208. For example, the second portion 208C may be formed from a material that may be different from a material of the first portion 208B and forms the funnel shaped alignment member 210.

The funnel shaped alignment member 210 may include a suitable design, shape, and structure, which may be configured to extend from the base 208A of the bracket 208 and receive the protrusion 204B of the cover 204. In an embodiment, the funnel shaped alignment member 210 may include a first orifice 210A and a second orifice 210B. In an embodiment, the first orifice 210A may be larger than the second orifice 210B. In another embodiment, the first orifice 210A may form a frusto-conical interface (such as, a frusto-conical extension between the first orifice 210A and the second orifice 210B) with the second orifice 210B. In another embodiment, the first orifice 210A may be smaller than the second orifice 210B. In yet another embodiment, the first orifice 210A may be same as the second orifice 210B.

The first orifice 210A may be configured to align the cover 204 with the bracket 208. In an embodiment, the first orifice 210A may have a larger diameter than the second orifice 210B. Such larger diameter facilitates an ease in alignment of the protrusion 204B of the cover 204 within the first orifice 210A of the bracket 208. Therefore, the operator may quickly align the cover 204 with the bracket 208 and may avoid any misalignment between the cover 204 and the bracket 208.

The second orifice 210B may be configured to lock datum levels of the cover 204 and the bracket 208 based on a user preference. In an embodiment, based on the alignment of the protrusion 204B within the first orifice 210A, the operator may further control a movement of the protrusion 204B within the first orifice 210A, until the protrusion 204B reaches the second orifice 210B. Based on the movement of the protrusion 204B, the operator may lock the datum levels of the second orifice 210B, via the first orifice 210A. As the datum levels are locked between the cover 204 and the bracket 208, it may be easier for the operator to precisely align and install the sensor mounting assembly 100 on the vehicle 102, which may further improve ergonomics in the assembly line of the vehicle 102.

In another embodiment, the funnel shaped alignment member 210 may form a conduit (not shown) connecting the first orifice 210A and the second orifice 210B. In such instances, the cover 204 may have the protrusion 204B that may be configured be inserted in the conduit, to align the cover 204 with the bracket 208, and form the storage cavity 212 within the cover 204. Therefore, the cover 204 may enclose the sensor 206, via the storage cavity 212.

The vehicle 102 may also include a front windshield 216. The front windshield 216 may be a transparent screen, which may be configured to be formed from a laminated safety glass that may protect the occupants and/or the operator of the vehicle 102 from wind, dust, and any debris that may be received from the surrounding environment of the vehicle 102. The front windshield 216 may also provide a structural support to the vehicle 102. It may be noted that the front windshield 216 shown in FIG. 2 is presented merely as an example of a generic windshield and further description of the front windshield 216 has been omitted from the disclosure for the sake of brevity.

In an embodiment, the front windshield 216 of the vehicle may be secured to a first surface 218A (such as a specific area/portion) of the roof rail and the bracket 208 may be secured to a second surface 218B (such as another specific area/portion) of the roof rail 202B. In an example, the second surface 218B may be located substantially planar to the first surface 218A of the roof rail 202B. Therefore, as the operator shall directly secure the bracket 208 to the second surface 218B that may be accessed from the interior cabin 202C of the vehicle 102, there may not be a requirement for the operator to climb on to the roof of the vehicle 102 and thus, further improve ergonomics in the assembly line of the vehicle 102.

In another embodiment, to facilitate an optimal sealing between the cover 204 and the bracket 208, the viewing window 204C may be coupled to a portion of the cover 204. For example, the viewing window 204C of the cover 204 has the end segment 204D, which may be secured to the portion of the front windshield 216 of the vehicle 102. For example, the optimal sealing between the end segment 204D and the front windshield 216, with the roof rail 202B, may protect the sensor 206 against the ingress of fluids (such as, via the rainfall or other liquids) and the ingress of dust particles from the surrounding environment of the vehicle 102. In another example, the optimal sealing between the viewing window 204C and the cover 204 may protect the sensor 206 against the ingress of fluids (such as, via the rainfall or other liquids) and the ingress of dust particles from the surrounding environment of the vehicle 102. In yet another example, the optimal sealing between the section 204A and the glass roof 202A of the vehicle 102, may protect the sensor 206 against the ingress of fluids (such as, via the rainfall or other liquids) and the ingress of dust particles from the surrounding environment of the vehicle 102. In yet another example, the optimal sealing between the section 204A and the glass roof 202A and the roof rail 202B of the vehicle 102, may protect the sensor 206 against the ingress of fluids (such as, via the rainfall or other liquids) and the ingress of dust particles from the surrounding environment of the vehicle 102.

In operation with respect to FIG. 2, the sensor mounting assembly 100 to hold the sensor 206 for the vehicle 102 is shown. The sensor mounting assembly 100 may include the cover 204 that may be coupled to the glass roof 202A of the vehicle 102. The cover 204 may be configured to enclose the sensor 206 that may be disposed proximate to the glass roof 202A of the vehicle 102. Such coupling between the cover 204 and glass roof 202A may facilitate precise positioning and assembly of the sensor 206 and improve ergonomics in the assembly line of the vehicle 102.

The sensor mounting assembly 100 may further include the bracket 208 that may be coupled to the roof rail 202B, which may be located beneath the glass roof 202A of the vehicle 102. The bracket 208 may include the first portion 208B and the second portion 208C. The first portion 208B may be configured to hold the sensor 206. The second portion 208C may form a funnel shaped alignment member 210 that may be configured to align the cover 204 with the bracket 208. In an embodiment, the funnel shaped alignment member 210 may include the first orifice 210A that may be configured to align the protrusion 204B of the cover 204 with the bracket 208.

In an insertion event, the protrusion 204B of the cover 204 may be configured to be inserted in the funnel shaped alignment member 210. Based on an insertion of the protrusion 204B within the first orifice 210A, the cover 204 may be configured to dispose the protrusion 204B in the first orifice 210A to align the cover with the bracket. Based on the alignment, the cover 204 may be further configured to insert the protrusion 204B into the first orifice 210A to reach the second orifice 210B, via the frusto-conical interface, to lock the datum levels of the cover 204 and the bracket 208, based on the user preference. Therefore, as the datum levels are locked between the cover 204 and the bracket 208, it may be easier for the operator to precisely align and install the sensor mounting assembly 100 on the vehicle 102, which may further improve ergonomics in the assembly line of the vehicle 102.

FIG. 3 is a diagram that illustrates an exemplary scenario to couple a cover with a bracket of the sensor mounting assembly of FIG. 1, in accordance with an embodiment of the disclosure. FIG. 3 is explained in conjunction with elements from FIG. 1, and FIG. 2. With reference to FIG. 3, there is shown an exemplary scenario 300 that shows a first structural configuration 302 and a second structural configuration 304, for the sensor mounting assembly 100.

In the first structural configuration 302, there is shown the sensor mounting assembly 100 having the bracket 208 with the funnel shaped alignment member 210 (shown in FIG. 2) that may have a L-shaped structure 306. The L-shaped structure 306 may include a lateral arm extension 306A and a funnel conduit 306B. The lateral arm extension 306A may be configured to horizontally extend from the bracket 208 for a first length (not shown).

In an embodiment, the funnel conduit 306B may be located substantially perpendicular to the lateral arm extension 306A. For example, the funnel conduit 306B may be configured to vertically extend from an end portion of the lateral arm extension 306A. The funnel conduit 306B may extend at a second length (not shown) and configured to receive a part (such as the protrusion 204B, shown in FIG. 2) of the cover 204. In an example, the first length of the lateral arm extension 306A may be smaller than the second length of the funnel conduit 306B. In another example, the first length of the lateral arm extension 306A may be larger than the second length of the funnel conduit 306B. In yet another example, the first length of the lateral arm extension 306A may be same as the second length of the funnel conduit 306B.

In embodiment, the lateral arm extension 306A may be disposed at a first datum level 308A and extends towards the first direction from the base 208A (shown in FIG. 2) of the bracket 208. The funnel conduit 306B may be disposed at a second datum level 308B and extends towards the second direction from the base 208A of the bracket 208. In an example, the first datum level 308A of the lateral arm extension 306A may be smaller than the second datum level 308B of the funnel conduit 306B. In another example, the first datum level 308A of the lateral arm extension 306A may be larger than the second datum level 308B of the funnel conduit 306B. In yet another example, the first datum level 308A of the lateral arm extension 306A may be equal to the second datum level 308B of the funnel conduit 306B.

In an embodiment, a portion (i.e., the lateral arm extension 306A) of the bracket 208 may be disposed on the roof rail 202B at the first datum level 308A from the base of the roof rail 202B, and the funnel shaped alignment member 210 of the bracket 208 may be inserted in an opening of the roof rail 202B, such that, the funnel shaped alignment member 210 may reach the second datum level 308B from the base of the roof rail. In another embodiment, the funnel conduit 306B of the bracket 208 may be inserted in a portion (for example, the opening) of the roof rail, such that, an insertion of the funnel conduit 306B may allow the lateral arm extension 306A and other portions of the bracket 208 to touch a surface (such as the base) of the roof rail 202B.

In operation, the protrusion 204B (shown in FIG. 2) from the cover 204 may be aligned with the funnel conduit 306B of the bracket 208. Based on the alignment, the protrusion 204B of the cover 204 may be inserted in the funnel shaped alignment member 210 until the protrusion 204B reaches the second datum level 308B. The protrusion 204B and the funnel shaped alignment member 210 (such as the funnel conduit 306B) may then be coupled via a coupling operation as described below.

In the coupling operation of the first structural configuration 302, the operator may control the cover 204 to insert the protrusion 204B into the first orifice 210A (shown in FIG. 2) of the funnel shaped alignment member 210 (i.e., the conduit) until the protrusion 204B reaches the second orifice 210B of the funnel shaped alignment member 210 (i.e., the conduit). Based on the insertion, the operator may further control the cover 204 to lock datum levels of the cover 204 and the bracket 208, based on a heat activated adhesive material 310 disposed between the protrusion 204B and the funnel shaped alignment member 210 (i.e., the conduit). The heat activated adhesive material 310 may form a firm seal between the protrusion 204B and the funnel conduit 306B and protect the sensor 206 against the ingress of fluids (such as, via the rainfall or other liquids) and the ingress of dust particles from the surrounding environment of the vehicle 102.

In the second structural configuration 304, components (such as the cover 204, the sensor 206, and the bracket 208) of the sensor mounting assembly 100 are substantially same as the first structural configuration 302, excluding an operation of installation of the protrusion 204B in the funnel conduit 306B. Hence, such components are omitted from the second structural configuration 304 for the sake of brevity.

In the coupling operation of the second structural configuration 304, the operator may control the cover 204 to insert the protrusion 204B into the first orifice 210A of the funnel shaped alignment member 210 (i.e., the conduit) until the protrusion 204B reaches the second orifice 210B (shown in FIG. 2) of the funnel shaped alignment member 210 (i.e., the conduit). Based on the insertion, the operator may further control the cover 204 to lock datum levels of the cover 204 and the bracket 208, based on a snap-fit connection 312 disposed between the protrusion 204B and the funnel shaped alignment member 210 (i.e., the conduit). The snap-fit connection 312 may form a firm seal between the protrusion 204B and the funnel conduit 306B and protect the sensor 206 against the ingress of fluids (such as, via the rainfall or other liquids) and the ingress of dust particles from the surrounding environment of the vehicle 102. The snap-fit connection 312 shown in FIG. 3 is merely an exemplary representation of a mechanical connection between the protrusion 204B and the funnel conduit 306B. Such mechanical connection may be replaced by any other mechanical connection, for example, a screw-fit connection, a riveted connection, a magnetic connection, and the like.

Figure 4:
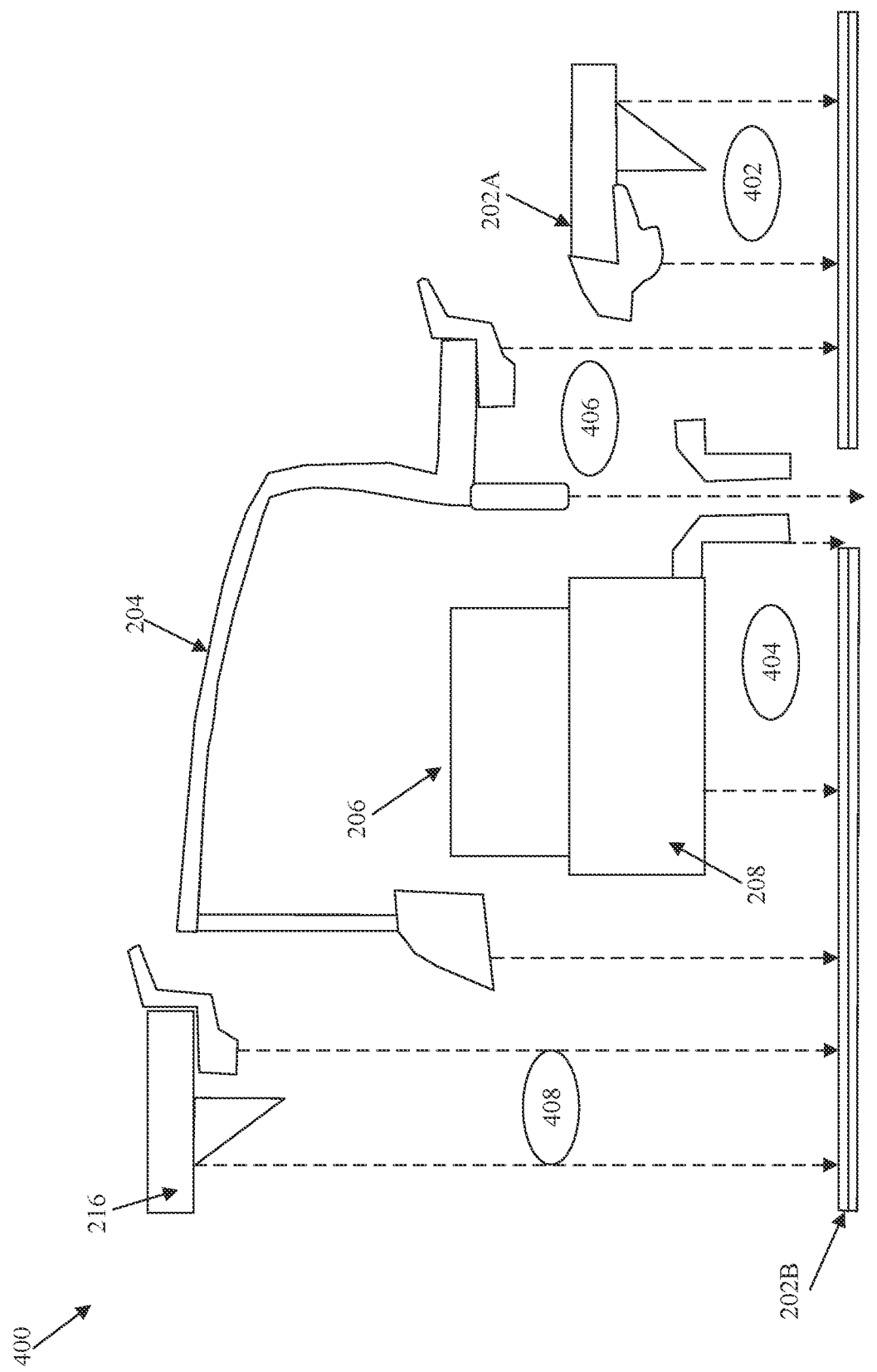
FIG. 4 is a diagram that illustrates an exemplary scenario to form the sensor mounting assembly of FIG. 1, in accordance with an embodiment of the disclosure.

FIG. 4 is a diagram that illustrates an exemplary scenario to form the sensor mounting assembly of FIG. 1, in accordance with an embodiment of the disclosure. FIG. 4 is explained in conjunction with elements from FIG. 1, FIG. 2, and FIG. 3. With reference to FIG. 4, there is shown an exemplary operation scenario 400 to form the sensor mounting assembly 100. The exemplary operation scenario 400 may include a plurality of operations to form the sensor mounting assembly 100. The plurality of operations may include, but not limited to, a first operation 402, a second operation 404, a third operation 406, and a fourth operation 408.

In the first operation 402, the glass roof 202A may be configured to be coupled to the roof rail 202B of the vehicle 102. In an embodiment, the operator may couple the glass roof 202A to the roof rail 202B of the vehicle 102, as described further, for example, in FIG. 1, FIG. 2, and FIG. 3.

In the second operation 404, the funnel shaped alignment member 210 (shown in FIG. 2) of the bracket 208 may be configured to be coupled with the opening of the roof rail 202B of the vehicle 102. In an embodiment, the operator may couple the funnel shaped alignment member 210 of the bracket 208 with the opening of the roof rail 202B, as described further, for example, in FIG. 1, FIG. 2, and FIG. 3.

In the third operation 406, the protrusion 204B (shown in FIG. 2) of the cover 204 may be configured to be coupled with the funnel conduit 306B of the funnel shaped alignment member 210. In an embodiment, the operator may couple the protrusion 204B within the funnel conduit 306B, as described further, for example, in FIG. 1, FIG. 2, and FIG. 3.

In the fourth operation 408, the front windshield 216 may be configured to be coupled with the end segment 204D of the cover 204 to seal the sensor 206 disposed in the storage cavity 212 of the sensor mounting assembly 100. In an embodiment, the operator may couple the front windshield 216 with the end segment 204D (shown in FIG. 2) of the cover 204 to seal the sensor 206 disposed in the storage cavity 212 (shown in FIG. 2) of the sensor mounting assembly 100, as described further, for example, in FIG. 1, FIG. 2, and FIG. 3.

The plurality of operations shown in FIG. 4 is illustrated as discrete operations, such as from 402 to 406, which relates to the method of forming the sensor mounting assembly 100. However, in certain embodiments, such discrete operations may be further divided into additional operations, combined into fewer operations, or eliminated, depending on the implementation without detracting from the essence of the disclosed embodiments.

FIG. 5 is a flowchart that illustrates exemplary operations for forming a sensor mounting assembly, in accordance with an embodiment of the disclosure. FIG. 5 is explained in conjunction with elements from FIG. 1, FIG. 2, FIG. 3, and FIG. 4. With reference to FIG. 5, there is shown a flowchart 500. The operations from 502 to 504 may be implemented, for example, by the sensor mounting assembly 100 or an operator associated with the sensor mounting assembly 100. The operations of the flowchart 500 may start at 502.

At 502, the cover 204 may be coupled to the glass roof 202A of the vehicle 102, such that, the cover 204 encloses the sensor 206 disposed proximate to the glass roof 202A of the vehicle 102. In an embodiment, the operator or the sensor mounting assembly is configured to couple the cover 204 with the glass roof 202A of the vehicle 102, such that, the cover 204 encloses the sensor 206 disposed proximate to the glass roof 202A of the vehicle 102, as described further, for example, in FIG. 1, FIG. 2, and FIG. 3.

At 504, the bracket 208 may be coupled to the roof rail 202B located beneath the glass roof 202A of the vehicle 102, wherein the bracket 208 may have the first portion 208B that is configured to hold the sensor 206 and the second portion 208C that is configured to form the funnel shaped alignment member 210 to align the cover 204 with bracket 208, as described further, for example, in FIG. 1, FIG. 2, and FIG. 3.

The flowchart shown in FIG. 5 is illustrated as discrete operations, such as from 502 to 504, which relates to the method of forming the sensor mounting assembly 100. However, in certain embodiments, such discrete operations may be further divided into additional operations, combined into fewer operations, or eliminated, depending on the implementation without detracting from the essence of the disclosed embodiments.

For the purposes of the present disclosure, expressions, such as "including", "comprising", "incorporating", "consisting of", "have", "is", used to describe and claim the present disclosure, are intended to be construed in a non-exclusive manner, namely allowing for items, components or elements not explicitly described also to be present. Reference to the singular is also to be construed to relate to the plural. Further, all joinder references (e.g., attached, coupled, connected, o the like) are used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A sensor mounting assembly, comprising:
    a cover coupled to a glass roof of a vehicle, wherein the cover is configured to enclose a sensor that is disposed proximate to the glass roof of the vehicle; and
    a bracket coupled to a roof rail that is located beneath the glass roof of the vehicle, wherein the bracket has a first portion and a second portion,
        the first portion is configured to hold the sensor, and
        the second portion forms a funnel shaped alignment member that is configured to align the cover with the bracket.

2. The sensor mounting assembly according to claim 1, wherein,
    the funnel shaped alignment member comprises a first orifice and a second orifice,
    the first orifice is configured to align the cover with the bracket, and
    the second orifice is configured to lock datum levels of the cover and the bracket based on a user preference.

3. The sensor mounting assembly according to claim 2, wherein,
    the first orifice is larger than the second orifice.

4. The sensor mounting assembly according to claim 2, wherein,
    the first orifice forms a frusto-conical interface with the second orifice.

5. The sensor mounting assembly according to claim 4, wherein,
    the cover has a protrusion that extends from a section of the cover, the protrusion of the cover is configured to be inserted in the funnel shaped alignment member, wherein in an insertion event,
    the cover is configured to:
        dispose the protrusion in the first orifice to align the cover with the bracket, and
        insert the protrusion into the first orifice to reach the second orifice, via the frusto-conical interface, to lock the datum levels of the cover and the bracket based on the user preference.

6. The sensor mounting assembly according to claim 1, wherein,
    a portion of the bracket is disposed on the roof rail at a first datum level from a base of the roof rail, and
    the funnel shaped alignment member of the bracket is inserted in an opening of the roof rail, such that, the funnel shaped alignment member reaches a second datum level from the base of the roof rail.

7. The sensor mounting assembly according to claim 6, wherein,
    the cover has a protrusion that extends from a section of the cover, the protrusion of the cover is configured to be inserted in the funnel shaped alignment member until the protrusion reaches the second datum level.

8. The sensor mounting assembly according to claim 1, wherein,
    the funnel shaped alignment member extends from a base of the bracket.

9. The sensor mounting assembly according to claim 1, wherein,
    the funnel shaped alignment member has a L-shaped structure that comprises a lateral arm extension and a funnel conduit, and wherein the funnel conduit is configured to receive a part of the cover.

10. The sensor mounting assembly according to claim 9, wherein,
    the funnel conduit is located substantially perpendicular to the lateral arm extension.

11. The sensor mounting assembly according to claim 9, wherein the funnel conduit of the bracket is inserted in a portion of the roof rail, such that, an insertion of the funnel conduit allows the lateral arm extension and other portions of the bracket to touch a surface of the roof rail.

12. The sensor mounting assembly according to claim 1, wherein,
    the funnel shaped alignment member forms a conduit, and
    the cover has a protrusion that is configured be inserted in the conduit, to align the cover with the bracket, and form a storage cavity within the cover, the cover is configured to enclose the sensor, via the storage cavity.

13. The sensor mounting assembly according to claim 12, wherein,
    the conduit comprises a first orifice and a second orifice; and
    the cover is configured to:
        insert the protrusion into the first orifice of the conduit until the protrusion reaches the second orifice of the conduit, and
        lock datum levels of the cover and the bracket, based on a heat activated adhesive material disposed between the protrusion and the conduit.

14. The sensor mounting assembly according to claim 12, wherein,
    the conduit comprises a first orifice and a second orifice; and
    the cover is configured to:
        insert the protrusion into the first orifice of the conduit until the protrusion reaches the second orifice of the conduit, and lock datum levels of the cover and the bracket, based on a snap-fit connection between the protrusion and the conduit.

15. The sensor mounting assembly according to claim 1, wherein the sensor is a LiDAR sensor that has a horizontal field-of-view between 1-360 degrees and a vertical field-of-view between 1-45 degrees.

16. The sensor mounting assembly according to claim 15, wherein the cover has a viewing window to allow at least one of: the horizontal field-of-view and the vertical field-of-view for the sensor.

17. The sensor mounting assembly according to claim 16, wherein the viewing window has an end segment, which is secured to a portion of a front windshield of the vehicle.

18. The sensor mounting assembly according to claim 17, wherein the front windshield of the vehicle is secured to a first surface of the roof rail and the bracket is secured to a second surface of the roof rail, the second surface is substantially planar to the first surface.

19. A sensor mounting assembly, comprising:
a cover is configured to enclose a sensor that is disposed proximate to a glass roof of a vehicle; and
a bracket coupled to a roof rail that is located beneath the glass roof of the vehicle, wherein the bracket has a first portion and a second portion,
the first portion is configured to hold the sensor, and
the second portion forms a funnel shaped alignment member that has a first orifice and a second orifice, and wherein
the first orifice aligns the cover with the bracket, and
the second orifice locks datum levels of the cover and the bracket based on a user preference, wherein the first orifice is larger than the second orifice.

20. A method, comprising:
coupling a cover to a glass roof of a vehicle, wherein the cover is configured to enclose a sensor that is disposed proximate to the glass roof of the vehicle; and
coupling a bracket to a roof rail that is located beneath the glass roof of the vehicle, wherein the bracket has a first portion and a second portion,
the first portion is configured to hold the sensor, and
the second portion forms a funnel shaped alignment member that is configured to align the cover with the bracket.

* * * * *